Jan. 31, 1956

L. E. SMITH 2,732,716

VAPOUR PRESSURE THERMOMETER

Filed Sept. 8, 1950

INVENTOR.
Lawrence E. Smith
BY
George Lynn De Mott

United States Patent Office 2,732,716
Patented Jan. 31, 1956

2,732,716

VAPOUR PRESSURE THERMOMETER

Lawrence E. Smith, Bethlehem, Conn., assignor to The Bristol Company, Waterbury, Conn., a corporation of Connecticut Application September 8, 1950, Serial No. 183,823

3 Claims. (Cl. 73—369)

This invention relates to linkage systems for measuring instruments, and more particularly to linkage systems for producing a predetermined type of indication in response to movements of the sensitive element of an instrument having a response which is non-linear. More particularly the invention is concerned with a linkage for imparting a linear or other desired characteristic to an indicating instrument of the vapor pressure class, such as a filled system thermometer.

Vapor pressure instruments of this type are well known and have long been in wide use, but since the pressure-temperature response curve of such instruments is not a straight line, their use has been greatly restricted and has required complicated and expensive linkage to give a reasonably acceptable response curve. The present invention is predicated upon the discovery that a relatively obscure kinematic linkage known as a quadric crank chain may be utilized to overcome and compensate for the disparity between the instrument response and its indication, so that a substantially linear or other desired characteristic may be imparted to an instrument having a decidedly non-linear characteristic. Furthermore, the linkage may be tailored accurately to the characteristics of the particular fluid used, thus imparting to the device the added advantage of versatility. While the response through the linkage is referred to as an indication, it is to be understood that this does not necessarily mean a pointer passing over a scale, as it may be the actuating element of a regulator or any similar mechanism where a linear or other response characteristic is useful. Furthermore the invention is not limited to the examples which are given herein for purposes of illustration.

The objects of the invention are to simplify and improve the accuracy of vapor pressure instruments; to provide a linkage which may be made free from adjustment; to provide linkage which may be patterned after the fluid with which it is to be used, and to generally improve the construction and reliability of instruments of the vapor pressure class, as well as other instruments having an inherently non-linear response which is to be translated into increments of movement which fit a certain pattern.

Other objects and advantages of the invention will be apparent from the following description when it is read in conjunction with the accompanying drawing in which Fig. 1 is a front elevation of a vapor pressure thermometer having the present invention embodied therein, Fig. 2 is a diagram showing the trigonometric relations of the parts of the linkage shown in Fig. 1.

Figure 1:
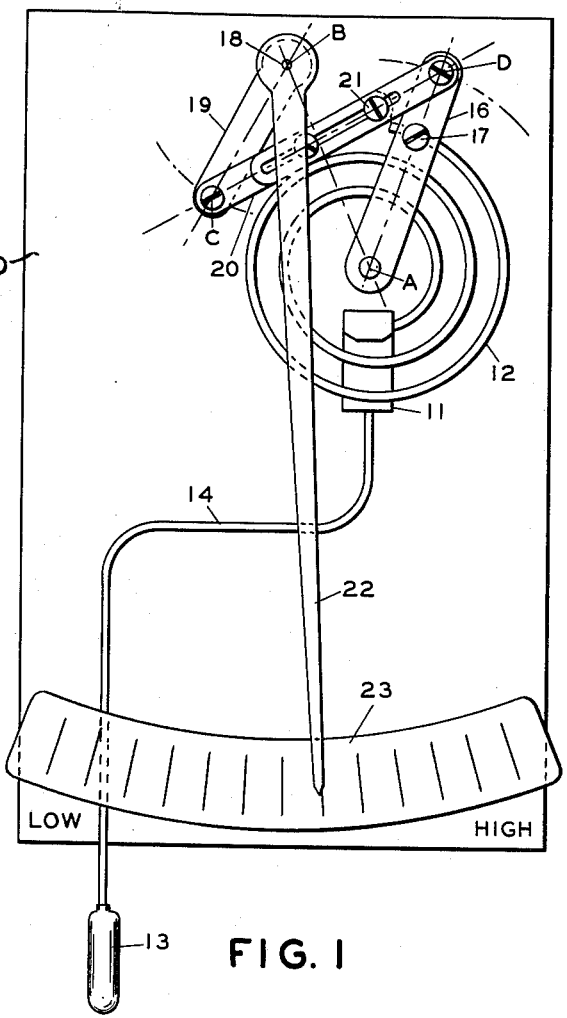

Referring first to Fig. 1 reference character 10 designates a base plate upon which is mounted a block 11 having a fluid cavity communicating with a thermal bulb 13 through a capillary tube 14. Mounted on the block 11 and in communication with the cavity therein is a Bourdon spring 12, comprising a spirally coiled tube of flattened cross section. The free end of spring 12 remote from block 11 is movable in an arcuate path and, as is well known, will be displaced along said path with a deflection proportional to changes in the fluid pressure within the "thermal system" made up of thermal bulb 13, tube 14, block 11 and spring 12. As illustrated, increases in internal fluid pressure within the system will cause the free end of spring 12 to be displaced in a clockwise sense. As already indicated generally, the characteristics of the system just described are such as to produce an increasing scale if the free end of spring 12 carries an indicator, that is the movements of the free end of the spring are not a straight-line function of the temperature changes occurring in the bulb 13.

The linkage utilized according to the present invention will now be described, and its relation to the indicating mechanism pointed out. Attached to the free end of spring 16 at 17 and centrally pivoted within the spring is an arm 16. Pivoted about an axis B is a spindle 18 carrying a pointer 22 movable over a scale 23. The axis B is displaced from and parallel to axis A by a predetermined amount as set forth below. Secured to spindle 18 is a lever arm 19 pivoted near its free extremity to one end of an adjustable link 20. The link 20 is made up of two sections slidably related and capable of being secured together at 21. The link is pivoted to arm 16 at D so that arms 16 and 19 are disposed on opposite sides of a straight line joining the axes A and B and the free pivot points C and D are connected by link 20. Hence, in all operating positions of the linkage, line CD will intersect line AB. While the link 20 is shown as adjustable to vary its effective length to suit particular conditions, it will usually be preferable in practice to make this link of fixed length predetermined at the factory to suit the particular fluid used in the thermometer. In this way all possibility of undesired changes in adjustment will be avoided, and a small number of interchangeable links will provide the desired accuracy and versatility that is characteristic of the invention when different fluids are used.

The linkage mechanism just described is known kinematically as a crossed quadric crank chain having a fixed link AB, angularly displaceable arms AD and BC pivotally attached to the extremities of link AB, and a link CD interconnecting the free extremities of the arms and crossing the link AB. While this linkage is known per se, the present invention is concerned with an adaptation of it which makes it capable of translating varying movements into indications having a predetermined characteristic such as a straight line characteristic.

Figure 2:
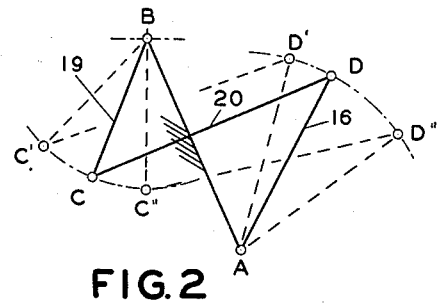

The action of the linkage will be understood from reference to the diagram of Fig. 2 wherein the reference characters correspond to those used in Fig. 1. It will be clear that within a selected range of operation, uniform increments of angular deflection of the arm 16, corresponding to similar increments of fluid pressure within Bourdon spring 12, will produce progressively decreasing increments of deflection of the arm 19, and therefore of pointer 22. For example, a displacement of the arm 19 from the intermediate position BC in Fig. 2, to extreme positions BC' and BC", representing equal angles on opposite sides of position BC, will cause widely differing deflections of the arm 16 from its intermediate position. It will be seen that under the conditions assumed, the excursion DD' of point D when arm 19 is moved to position BC', is much smaller than excursion DD" when arm 19 is moved to position BC". Thus the non-uniform movements of arm 16 can be translated into uniform movements of arm 19 and pointer 22 attached to it, giving the scale 23 uniform graduation.

While it may be mathematically shown, and experimentally confirmed that, through a reasonable working range, the mechanical dimensions of the linkage are not extremely critical, it has been found that an arrangement capable of a high degree of compensation, and readily adaptable to a variety of ranges and corresponding pressure fluids is embodied in a mechanism having the following proportions:

| | |
|---|---|
| A—B | 1.000 |
| A—D | 0.858 |
| B—C | 0.643 |
| C—D | 0.858 to 1.287 |

With the above-listed relative dimensions of links, the angle BAD should be set to approximately 40° at a temperature corresponding to the lowest point in the selected range of measurement. Under these conditions with the link 20 selected, or adjusted, to a suitable length C—D within the selected range, a substantially linear scale may be obtained with a variety of volatile fluids suited to different working ranges of temperature measurement. Since, however, practical limitations restrict the number of such fluids to a relatively small number, and since optimum compensation for each fluid is obtained with a definite length of the link 20, it has been found practically expedient, instead of making that link adjustable, to provide individual units, each having a fixed length C—D, and to incorporate in the mechanism as a part of the factory assembly that length of link which is best suited to the pressure fluid corresponding to the working range of the instrument. In this way the compensating linkage is inherently and permanently suited to a predetermined scale and is not subject to accidental disturbance of its geometrical proportioning. Calibration in the factory or in the field is effected by conventional means forming no part of the present invention, and hence, in the interest of clarity, has been omitted from the specification.

Figure 3:
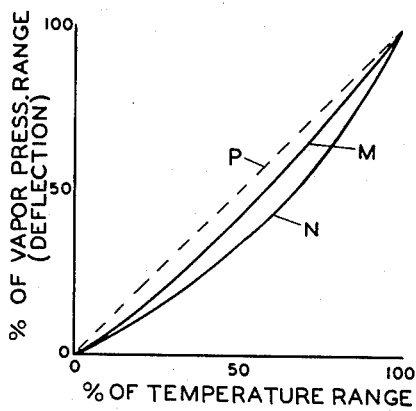
Fig. 3 is a graph showing the pressure-temperature response curve of the temperature sensing means of Fig. 1.
Figure 4:
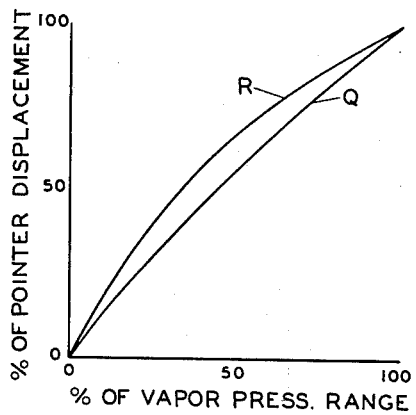
Fig. 4 is a graph showing the pressure response curve of the indicator of the instrument of Fig. 1.
Figure 5:
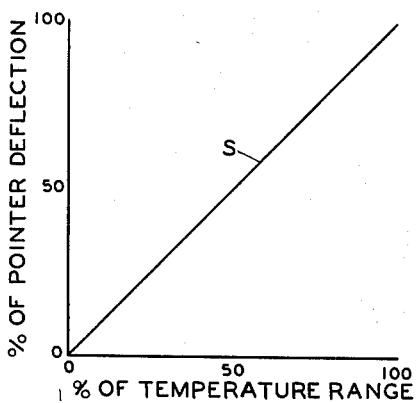
Fig. 5 is a graph showing the corrected indicator response curve when the indicator response is plotted as a function of the temperature.

The functional relationship of the several cooperating components of the invention will be clarified by reference to the graphic representation in Figs. 3, 4 and 5. Fig. 3 shows a curve in which vapor pressure is plotted against temperature, the curve M representing the relationship for a selected filling fluid over a range from 50° to 100° F., and N that for the same fluid over a range from 40° to 200°. With other filling fluids other characteristic curves would be obtained. The straight line P represents the ideal linear relationship, and, as might be expected, the greater the span of measurement the greater the deviation from the linear law. Fig. 4 illustrates the relation between angular deflection of the pointer spindle and the Bourdon spring under two conditions differing only in the selected length of link 20. Within predetermined operating limits, increasing the length of that link tends to increase the curvature of the graph. Curves Q and R represent the displacement relations obtained with the link 20 having respective selected length ratios of 0.893, and and of 1.250, to that of the base line AB. These dimensions provide compensation for the pressure/temperature relations represented by the curves M and N, respectively, in Fig. 3.

The graph S in Fig. 5 in which pointer displacements are plotted against temperature, is a straight line and represents the ideal relationship between those two variables. A suitable choice of relative dimensions and positioning of the cooperating elements of the linkage provides a mechanism whereby the mutually opposed tendencies of the curves in Figs. 3 and 4, respectively, may be combined to produce a resultant characteristic closely approaching such a straight line, and through a selected working range of temperature measurement approximating the same to a degree satisfactory for the purposes of the invention.

While the example given is confined to the special case where non-uniform increments of movement are translated into uniform increments to give a linear characteristic to the indications, numerous other arrangements are possible to make the pointer 22 conform to any particular type of scale. It thus becomes possible, through use of this invention, to fashion a linkage such as to provide a response which coincides with any particular type of scale, whether it has a uniform or a non-uniform characteristic. It is believed that the example confined to a linear scale is sufficient to illustrate the invention.

While particular dimensions of the parts of the linkage have been given, they are to be understood as representing only one of the possible arrangements which may be adopted to accomplish the results of the invention. For example, while the angle BAD has been given as 40 degrees, it may, in practice vary considerably from that amount. Consequently the invention, in its broadest aspect, is concerned not with specific dimensions, but with a proportioning of parts such as to translate the non-uniform response of measuring instruments into a predetermined type of indication to fit any desired type of scale.

Having thus described the invention what is claimed is:

1. A vapor pressure indicating instrument capable of producing a linear indication comprising a Bourdon tube connected to a bulb containing a liquid having a non-linear vapor pressure-temperature characteristic, said Bourdon tube having a free end, first and second links each having oppositely extending ends, said first link being supported at one end for rotation about a fixed axis located substantially centrally of said Bourdon spring, the other end of said first link being free and extending beyond said Bourdon tube and the free end of said tube being connected to said first link radially outwardly of the axis of rotation of said first link, said second link being supported at one end for rotation about an axis parallel to but displaced from said first-named axis, the other end of said second link being free and extending from its axis of rotation in a direction generally opposite to the direction in which the free end of the first link extends from its axis of rotation, a third link extending between and pivotally connected to the free ends of said first and second links, the lengths of the first and second links being such that the third link and the first link subtend therebetween an acute angle, and the third link and the second link subtend therebetween an acute angle, the lengths of the links being so proportioned that the said angles remain acute with said third link crossing a straight line between said axes in all positions of said third link wthin the range of said instrument, and a lever member fixed to the rotatably supported end of said second link for movement therewith.

2. An indicating instrument capable of producing a linear indication comprising a Bourdon tube connected to a bulb containing a liquid having a non-linear vapor pressure-temperature characteristic, said Bourdon tube having a free end, first and second links each having oppositely extending ends, said first link being supported at one end for rotation about a fixed axis located substantially centrally of said Bourdon tube, the other end of said first link being free and extending beyond said Bourdon tube and the free end of said tube being connected to said first link radially outwardly of the axis of rotation of said first link, said second link being supported at one end for rotation about an axis parallel to but displaced from said first-named axis, the other end of said second link being free and extending from its axis of rotation in a direction generally opposite to the direction in which the free end of said first link extends from its axis of rotation, a third link extending between and pivotally connected to the free ends of said first and second links, the lengths of the first and second links being such that the third link and the first link subtend therebetween an acute angle, and the third link and the second link subtend therebetween an acute angle, the lengths of the links being so proportioned that the said angles remain acute with said third link crossing a straight line between said axes in all positions of said third link within the range of said instrument, and a lever member fixed to the rotatably supported end of said second link for movement therewith, said links having the following proportions with respect to the distance between said axes taken as unity:

First link _____ 0.8–0.9
Second link _____ 0.6–0.7
Third link _____ 0.8–1.3

3. An indicating instrument as defined in claim 2 in which said links have the following proportions with respect to the distance between said axes taken as unity:

First link _____ 0.858
Second link _____ 0.643
Third link _____ 0.858 to 1.287

References Cited in the file of this patent

UNITED STATES PATENTS

| | | |
|---|---|---|
| 1,404,771 | Hopkins | Jan. 31, 1922 |
| 1,658,840 | Froehlich | Feb. 14, 1928 |
| 1,917,810 | Reynoldson | July 11, 1933 |
| 2,034,606 | Cheney et al. | Mar. 17, 1936 |
| 2,034,884 | Sharp | Mar. 24, 1936 |
| 2,131,573 | Snediker | Sept. 27, 1938 |
| 2,224,589 | Blum, Jr. | Dec. 10, 1940 |
| 2,230,544 | Noble | Feb. 4, 1941 |